(12) United States Patent
Lou et al.

(10) Patent No.: US 9,049,454 B2
(45) Date of Patent: Jun. 2, 2015

(54) HIGH EFFICIENCY LOW COMPLEXITY INTERPOLATION FILTERS

(75) Inventors: Jian Lou, San Diego, CA (US); Limin Wang, San Diego, CA (US)

(73) Assignee: GOOGLE TECHNOLOGY HOLDINGS LLC., Mountain View, CA (US)

( * ) Notice: Subject to any disclaimer, the term of this patent is extended or adjusted under 35 U.S.C. 154(b) by 339 days.

(21) Appl. No.: 13/354,201

(22) Filed: Jan. 19, 2012

(65) Prior Publication Data
US 2012/0183068 A1 Jul. 19, 2012

Related U.S. Application Data

(60) Provisional application No. 61/434,118, filed on Jan. 19, 2011, provisional application No. 61/435,742, filed on Jan. 24, 2011.

(51) Int. Cl.
| | |
|---|---|
| H04N 7/12 | (2006.01) |
| H04N 11/02 | (2006.01) |
| H04N 11/04 | (2006.01) |
| H04N 19/523 | (2014.01) |
| H04N 19/117 | (2014.01) |

(52) U.S. Cl.
CPC ........... *H04N 19/523* (2014.11); *H04N 19/117* (2014.11)

(58) Field of Classification Search
CPC .......... H04N 7/12; H04N 11/04; H04N 11/02
See application file for complete search history.

(56) References Cited

U.S. PATENT DOCUMENTS

| | | | | |
|---|---|---|---|---|
| 7,958,177 | B2 | 6/2011 | Zhu | |
| 8,576,906 | B2* | 11/2013 | Andersson et al. | 375/240.03 |
| 2003/0112864 | A1 | 6/2003 | Karczewicz et al. | |
| 2003/0194007 | A1* | 10/2003 | Chen et al. | 375/240.2 |
| 2003/0194009 | A1 | 10/2003 | Srinivasan | |
| 2004/0076333 | A1* | 4/2004 | Zhang et al. | 382/238 |
| 2005/0105611 | A1* | 5/2005 | Bjontegaard | 375/240.01 |
| 2006/0133506 | A1* | 6/2006 | Dang | 375/240.17 |
| 2007/0133687 | A1 | 6/2007 | Wittmann et al. | |
| 2009/0257499 | A1 | 10/2009 | Karczewicz et al. | |

(Continued)

OTHER PUBLICATIONS

Sato K. et al.; "Adaptive mc interpolation for memory access reduction in JVT video coding," Seventh International Symposium on Signal Processing and Its Applications; vol. 1; Jul. 1, 2003; pp. 77-80.
"H.26L Test Model Long Term No. 3 (TML-3) Draft 0," ITU-T Telecommunication Standardization Sector of ITU; May 16, 2000, pp. 1-24.
Yoshino T., el al.; "Enhanced switching of interpolation filter for HEVC," Motion Picture Expert Group or ISO/IEC; Oct. 28, 2010.
Wedi T. et al.; "Motion-and aliasing-compensated prediction for hybrid video coding," IEEE Transactions on Circuits and Systems for Video Technology; vol. 13, No. 7; Jul. 1, 2003; pp. 577-586.
Patent Cooperation Treaty, "International Search Report and Written Opinion of the International Searching Authority," for Int'l Application No. PCT/US2012/021912; Mar. 12, 2012.

*Primary Examiner* — Nhon Diep
(74) *Attorney, Agent, or Firm* — Young Basile Hanlon & MacFarlane P.C.

(57) ABSTRACT

Embodiments for high efficiency low complexity interpolation filters for High Efficiency Video Coding (HEVC) are disclosed herein, specifically novel techniques for a video compression system. In order to estimate and compensate sub-pel displacements, the image signal on these sub-pel positions is generated by an interpolation process. In HEVC, sub-pel pixel interpolation is performed using filters. As described herein, the filter may have, for example, eight taps to determine the sub-pel pixel values for sub-pel pixel positions, such as half-pel and quarter-pel positions. The taps weight the integer pixels with coefficient values to generate the sub-pel signals. Different coefficients may produce different compression performance in signal distortion and noise.

10 Claims, 6 Drawing Sheets

(56) References Cited

U.S. PATENT DOCUMENTS

| | | |
|---|---|---|
| 2009/0257503 A1 | 10/2009 | Ye et al. |
| 2010/0002770 A1 | 1/2010 | Motta et al. |
| 2010/0135398 A1* | 6/2010 | Wittmann et al. ........ 375/240.16 |
| 2011/0116546 A1* | 5/2011 | Guo et al. ................ 375/240.16 |
| 2011/0243471 A1 | 10/2011 | Alshina et al. |

* cited by examiner

1/k-PEL INTERPOLATION BASED-ON DCT

QUARTER - PEL POSITIONS

HIGH EFFICIENCY LOW COMPLEXITY INTERPOLATION FILTERS

CROSS REFERENCE TO RELATED APPLICATIONS

The present application claims priority to U.S. Provisional App. No. 61/434,118 for "High Efficiency Interpolation Filters" filed Jan. 19, 2011 and U.S. Provisional App. No. 61/435,742 for "High Efficiency Low Complexity Interpolation Filters" filed Jan. 24, 2011, the contents of which are incorporated herein by reference in their entirety.

BACKGROUND

Particular embodiments generally relate to video compression.

High-efficiency video coding (HEVC) is a block-based hybrid spatial and temporal predictive coding scheme. Similar to other video coding standards, such as motion picture experts group (MPEG)-1, MPEG-2, and MPEG-4, HEVC supports intra-picture, such as I picture, and inter-picture, such as B picture. In HEVC, P and B pictures are consolidated into a general B picture that can be used as a reference picture.

Intra-picture is coded without referring to any other pictures. Thus, only spatial prediction is allowed for a coding unit (CU)/prediction unit (PU) inside an intra-picture. Inter-picture, however, supports both intra- and inter-prediction. A CU/PU in an inter-picture may be either spatially or temporally predictive coded. Temporal predictive coding may reference pictures that were previously coded.

Temporal motion prediction is an effective method to increase the coding efficiency and provides high compression. HEVC uses a translational model for motion prediction. According to the translational model, a prediction signal for a given block in a current picture is generated from a corresponding block in a reference picture. The coordinates of the reference block as given by a motion vector that describes the translational motion along horizontal (x) and vertical (y) directions that would be added to or subtracted from the coordinates of the current block. A decoder needs the motion vector to decode the compressed video.

The pixels in the reference frame are used as the prediction. In one example, the motion may be captured in integer pixels. However, not all objects move with the spacing of integer pixels. For example, since an object motion is completely unrelated to the sampling grid, sometimes the object motion is more like a fractional-pel motion than a full-pel one. Thus, HEVC allows for motion vectors with sub-pel (fractional) pixel accuracy.

In order to estimate and compensate sub-pel displacements, the image signal on these sub-pel positions is generated by an interpolation process. In HEVC, sub-pel pixel interpolation is performed using finite impulse response (FIR) filters. Generally, the filter may have 8 taps to determine the sub-pel pixel values for sub-pel pixel positions, such as half-pel and quarter-pel positions. The taps of an interpolation filter weight the integer pixels with coefficient values to generate the sub-pel signals. Different coefficients may produce different compression performance in signal distortion and noise.

SUMMARY

One embodiment includes a method for encoding video content, the method comprising receiving a plurality of full-pel pixel values, determining a set of coefficients for an interpolation filter to interpolate a sub-pel pixel value for a motion compensation operation, assigning a first coefficient to weight a first full-pel pixel value in the plurality of full-pel pixel values in a first operation in the interpolation filter, the first coefficient having a value of −7, assigning a second coefficient to weight a second full-pel pixel value in the plurality of full-pel pixel values in a second operation in the interpolation filter, the second coefficient having a value of 39, assigning a third coefficient to weight a third full-pel pixel value in the plurality of full-pel pixel values in a third operation in the interpolation filter, the third coefficient having a value of 39, assigning a fourth coefficient to weight a fourth full-pel pixel value in the plurality of full-pel pixel values in a fourth operation in the interpolation filter, the fourth coefficient having a value of −7, determining the sub-pel pixel value from the first operation, the second operation, the third operation, and the fourth operation, and outputting the interpolated sub-pel pixel value for use in the motion compensation operation. In one embodiment, a fifth operation to weight a fifth full-pel pixel value with a fifth coefficient is not performed due to the fifth coefficient value being the zero value. In one embodiment, the first coefficient, second coefficient, third coefficient and fourth efficient each are multiplied by the same factor.

Another embodiment includes a method for decoding video content, the method comprising receiving a plurality of full-pel pixel values, determining a set of coefficients for an interpolation filter to interpolate a sub-pel pixel value for a motion compensation operation, assigning a first coefficient to weight a first full-pel pixel value in the plurality of full-pel pixel values in a first operation in the interpolation filter, the first coefficient having a value of −7, assigning a second coefficient to weight a second full-pel pixel value in the plurality of full-pel pixel values in a second operation in the interpolation filter, the second coefficient having a value of 39, assigning a third coefficient to weight a third full-pel pixel value in the plurality of full-pel pixel values in a third operation in the interpolation filter, the third coefficient having a value of 39, assigning a fourth coefficient to weight a fourth full-pel pixel value in the plurality of full-pel pixel values in a fourth operation in the interpolation filter, the fourth coefficient having a value of −7, determining the sub-pel pixel value from the first operation, the second operation, the third operation, and the fourth operation, and outputting the interpolated sub-pel pixel value for use in the motion compensation operation.

Yet another embodiment includes an apparatus for encoding video content, the apparatus comprising one or more computer processors, and a computer-readable storage medium comprising instructions for controlling the one or more computer processors to be operable to receive a plurality of full-pel pixel values, determine a set of coefficients for an interpolation filter to interpolate a sub-pel pixel value for a motion compensation operation, assign a first coefficient to weight a first full-pel pixel value in the plurality of full-pel pixel values in a first operation in the interpolation filter, the first coefficient having a value of −7, assign a second coefficient to weight a second full-pel pixel value in the plurality of full-pel pixel values in a second operation in the interpolation filter, the second coefficient having a value of 39, assign a third coefficient to weight a third full-pel pixel value in the plurality of full-pel pixel values in a third operation in the interpolation filter, the third coefficient having a value of 39, assign a fourth coefficient to weight a fourth full-pel pixel value in the plurality of full-pel pixel values in a fourth operation in the interpolation filter, the fourth coefficient having a value of −7, determine the sub-pel pixel value from the first operation, the second operation, the third operation, and the fourth operation, and output the interpolated sub-pel pixel value for use in the motion compensation operation.

Yet another embodiment includes an apparatus for decoding video content, the apparatus comprising one or more computer processors and a computer-readable storage medium comprising instructions for controlling the one or more computer processors to be operable to receive a plurality of full-pel pixel values, determine a set of coefficients for an interpolation filter to interpolate a sub-pel pixel value for a motion compensation operation, assign a first coefficient to weight a first full-pel pixel value in the plurality of full-pel pixel values in a first operation in the interpolation filter, the first coefficient having a value of −7, assign a second coefficient to weight a second full-pel pixel value in the plurality of full-pel pixel values in a second operation in the interpolation filter, the second coefficient having a value of 39, assign a third coefficient to weight a third full-pel pixel value in the plurality of full-pel pixel values in a third operation in the interpolation filter, the third coefficient having a value of 39, assign a fourth coefficient to weight a fourth full-pel pixel value in the plurality of full-pel pixel values in a fourth operation in the interpolation filter, the fourth coefficient having a value of −7, determine the sub-pel pixel value from the first operation, the second operation, the third operation, and the fourth operation, and output the interpolated sub-pel pixel value for use in the motion compensation operation.

One embodiment includes a method for encoding video content, the method comprising receiving a plurality of full-pel pixel values, determining a set of coefficients for an interpolation filter to interpolate a sub-pel pixel value for a motion compensation operation, assigning a first coefficient to weight a first full-pel pixel value in the plurality of full-pel pixel values in a first operation in the interpolation filter, the first coefficient having a value of −27, assigning a second coefficient to weight a second full-pel pixel value in the plurality of full-pel pixel values in a second operation in the interpolation filter, the second coefficient having a value of 155, assigning a third coefficient to weight a third full-pel pixel value in the plurality of full-pel pixel values in a third operation in the interpolation filter, the third coefficient having a value of 155, assigning a fourth coefficient to weight a fourth full-pel pixel value in the plurality of full-pel pixel values in a fourth operation in the interpolation filter, the fourth coefficient having a value of −27, determining the sub-pel pixel value from the first operation, the second operation, the third operation, and the fourth operation, and outputting the interpolated sub-pel pixel value for use in the motion compensation operation. In one embodiment, a fifth operation to weight a fifth full-pel pixel value with a fifth coefficient is not performed due to the fifth coefficient value being the zero value. In one embodiment, the first coefficient, second coefficient, third coefficient and fourth efficient each are multiplied by the same factor.

Another embodiment includes a method for decoding video content, the method comprising receiving a plurality of full-pel pixel values, determining a set of coefficients for an interpolation filter to interpolate a sub-pel pixel value for a motion compensation operation, assigning a first coefficient to weight a first full-pel pixel value in the plurality of full-pel pixel values in a first operation in the interpolation filter, the first coefficient having a value of −27, assigning a second coefficient to weight a second full-pel pixel value in the plurality of full-pel pixel values in a second operation in the interpolation filter, the second coefficient having a value of 155, assigning a third coefficient to weight a third full-pel pixel value in the plurality of full-pel pixel values in a third operation in the interpolation filter, the third coefficient having a value of 155, assigning a fourth coefficient to weight a fourth full-pel pixel value in the plurality of full-pel pixel values in a fourth operation in the interpolation filter, the fourth coefficient having a value of −27, determining the sub-pel pixel value from the first operation, the second operation, the third operation, and the fourth operation, and outputting the interpolated sub-pel pixel value for use in the motion compensation operation.

Yet another embodiment includes an apparatus for encoding video content, the apparatus comprising one or more computer processors and a computer-readable storage medium comprising instructions for controlling the one or more computer processors to be operable to receive a plurality of full-pel pixel values, determine a set of coefficients for an interpolation filter to interpolate a sub-pel pixel value for a motion compensation operation, assign a first coefficient to weight a first full-pel pixel value in the plurality of full-pel pixel values in a first operation in the interpolation filter, the first coefficient having a value of −27, assign a second coefficient to weight a second full-pel pixel value in the plurality of full-pel pixel values in a second operation in the interpolation filter, the second coefficient having a value of 155, assign a third coefficient to weight a third full-pel pixel value in the plurality of full-pel pixel values in a third operation in the interpolation filter, the third coefficient having a value of 155, assign a fourth coefficient to weight a fourth full-pel pixel value in the plurality of full-pel pixel values in a fourth operation in the interpolation filter, the fourth coefficient having a value of −27, determine the sub-pel pixel value from the first operation, the second operation, the third operation, and the fourth operation, and output the interpolated sub-pel pixel value for use in the motion compensation operation.

Yet another embodiment includes an apparatus for decoding video content, the apparatus comprising one or more computer processors; and a computer-readable storage medium comprising instructions for controlling the one or more computer processors to be operable to receive a plurality of full-pel pixel values, determine a set of coefficients for an interpolation filter to interpolate a sub-pel pixel value for a motion compensation operation, assign a first coefficient to weight a first full-pel pixel value in the plurality of full-pel pixel values in a first operation in the interpolation filter, the first coefficient having a value of −27, assign a second coefficient to weight a second full-pel pixel value in the plurality of full-pel pixel values in a second operation in the interpolation filter, the second coefficient having a value of 155, assign a third coefficient to weight a third full-pel pixel value in the plurality of full-pel pixel values in a third operation in the interpolation filter, the third coefficient having a value of 155, assign a fourth coefficient to weight a fourth full-pel pixel value in the plurality of full-pel pixel values in a fourth operation in the interpolation filter, the fourth coefficient having a value of −27, determine the sub-pel pixel value from the first operation, the second operation, the third operation, and the fourth operation, and output the interpolated sub-pel pixel value for use in the motion compensation operation.

The following detailed description and accompanying drawings provide a more detailed understanding of the nature and advantages of the present invention.

DETAILED DESCRIPTION

Described herein are techniques for a video compression system. In the following description, for purposes of explanation, numerous examples and specific details are set forth in order to provide a thorough understanding of embodiments of the present invention. Particular embodiments as defined by the claims may include some or all of the features in these examples alone or in combination with other features described below, and may further include modifications and equivalents of the features and concepts described herein.

Figure 1:
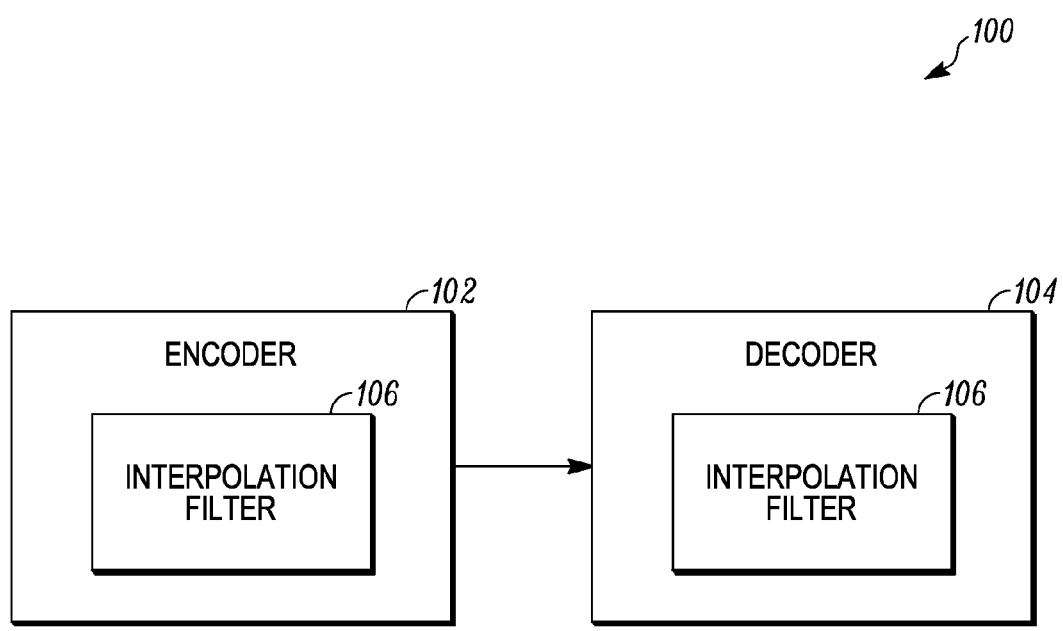
FIG. 1 depicts an example of a system for encoding and decoding video content according to one embodiment.

FIG. 1 depicts an example of a system 100 for encoding and decoding video content according to one embodiment. System 100 includes an encoder 102 and a decoder 104, both of which will be described in more detail below. Encoder 102 and decoder 104 perform temporal prediction through motion estimation. The motion prediction searches for a best match prediction for a current prediction unit (PU) over reference pictures. The best match prediction is described by a motion vector (MV) and associated reference picture ID. Also, a PU in a B picture may have up to two motion vectors.

The motion compensation allows for fractional (sub-pel) picture accuracy. Sub-pel pixel prediction is used because motion during two instances of time (the current and reference frames' capture times) can correspond to a sub-pel pixel position in pixel coordinates and generation of different prediction data corresponding to each sub-pel pixel positions allows for the possibility of conditioning the prediction signal to better match the signal in the current PU.

Encoder 102 and decoder 104 assign coefficients for an interpolation filter 106 to use to encode and decode a PU. Interpolation filters include taps that are used to determine the sub-pel pixel values for different sub-pel pixel positions, such as half-pel and quarter pel positions. The different interpolation filters may weight the taps with different values for coefficients and/or use a different number of taps. For example, for coefficient values of "0", an interpolation filter calculation using that coefficient is not necessary, as will be described in more detail below. This reduces complexity in the calculation. Also, the motion compensation may use adaptive sub-pel pixel interpolation for the PU. In this case, different interpolation filters may be used to determine the sub-pel pixel values.

Different coefficient values and/or the number of taps used produce different encoding/decoding results. Different coefficient values may be used for different types of video content. Particular embodiments select coefficient values that provide lower complexity. For example, the coefficients used require less computation and/or less data fetching.

Encoder and Decoder Examples

Figure 2A:
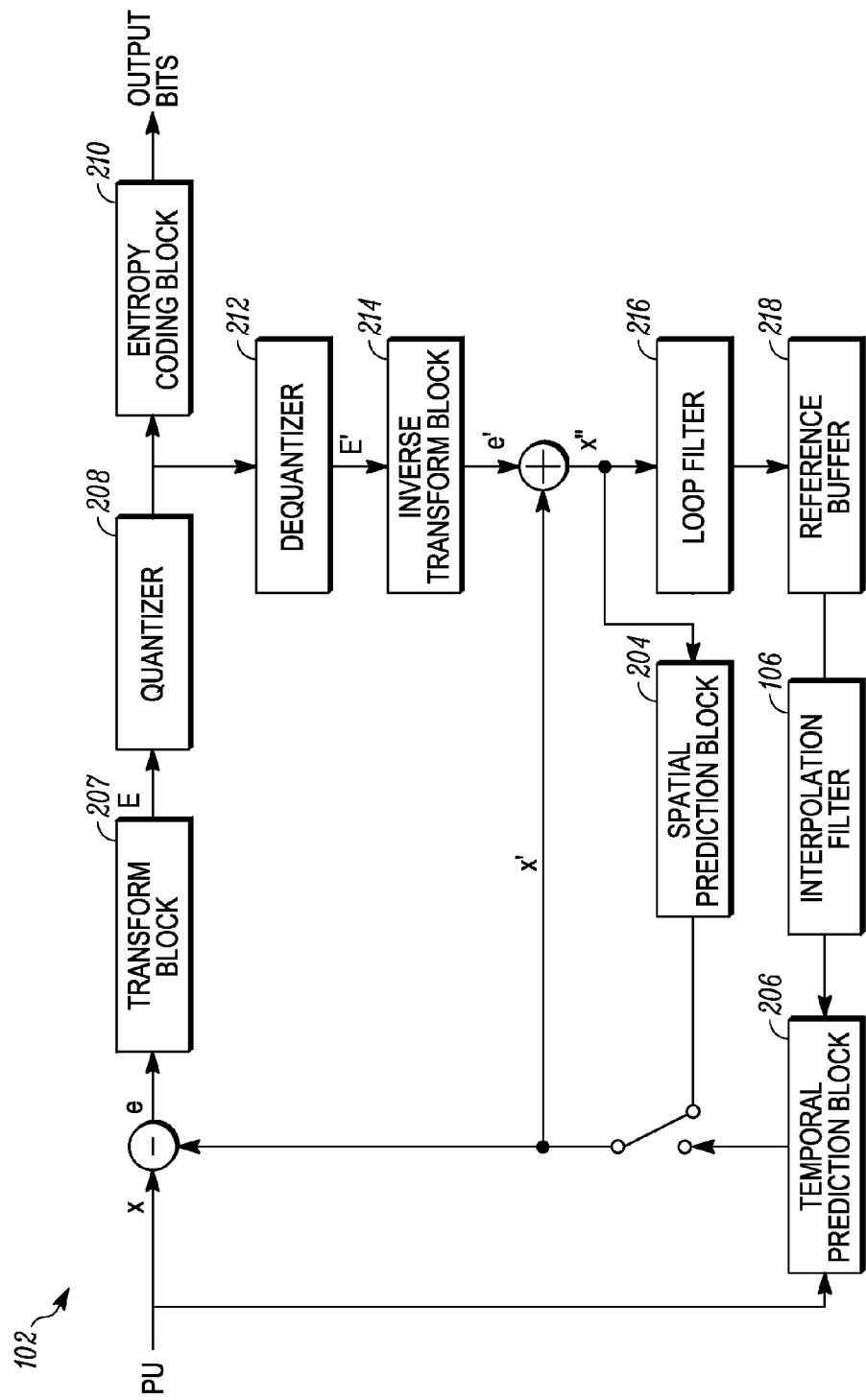
FIG. 2A depicts an example of an encoder according to one embodiment.

FIG. 2A depicts an example of an encoder 102 according to one embodiment. A general operation of encoder 102 will now be described. It will be understood that variations on the encoding process described will be appreciated by a person skilled in the art based on the disclosure and teachings herein.

For a current PU, x, a prediction PU, x', is obtained through either spatial prediction or temporal prediction. The prediction PU is then subtracted from the current PU, resulting in a residual PU, e. A spatial prediction block 204 may include different spatial prediction directions per PU, such as horizontal, vertical, 45-degree diagonal, 135-degree diagonal, DC (flat averaging), and planar.

A temporal prediction block 206 performs temporal prediction through a motion estimation and motion compensation operation. The motion estimation operation searches for a best match prediction for the current PU over reference pictures. The best match prediction is described by a motion vector (MV) and associated reference picture (refIdx). The motion vector and associated reference picture are included in the coded bit stream. In motion compensation, a best match prediction for the current PU is determined using the MV and refIdx.

Transform block 207 performs a transform operation with the residual PU, e. Transform block 207 outputs the residual PU in a transform domain, E.

A quantizer 208 then quantizes the transform coefficients of the residual PU, E. Quantizer 208 converts the transform coefficients into a finite number of possible values. Entropy coding block 210 entropy encodes the quantized coefficients, which results in final compression bits to be transmitted. Different entropy coding methods may be used, such as context-adaptive variable length coding (CAVLC) or context-adaptive binary arithmetic coding (CABAC).

Also, in a decoding process within encoder 102, a de-quantizer 212 de-quantizes the quantized transform coefficients of the residual PU. De-quantizer 212 then outputs the de-quantized transform coefficients of the residual PU, E'. An inverse transform block 214 receives the de-quantized transform coefficients, which are then inverse transformed resulting in a reconstructed residual PU, e'. The reconstructed PU, e', is then added to the corresponding prediction PU, x', either spatial or temporal, to form the new reconstructed PU, x". A loop filter 216 performs de-blocking on the reconstructed PU, x", to reduce blocking artifacts. Additionally, loop filter 216 may perform a sample adaptive offset process after the completion of the de-blocking filter process for the decoded picture, which compensates for a pixel value offset between reconstructed pixels and original pixels. Also, loop filter 216 may perform adaptive filtering over the reconstructed PU, which minimizes coding distortion between the input and output pictures. Additionally, if the reconstructed pictures are reference pictures, the reference pictures are stored in a reference buffer 218 for future temporal prediction.

Interpolation filter 106 interpolates sub-pel pixel values for temporal prediction block 206. Temporal prediction block 206 uses the sub-pel pixel values to generate a prediction of a current PU.

Figure 2B:
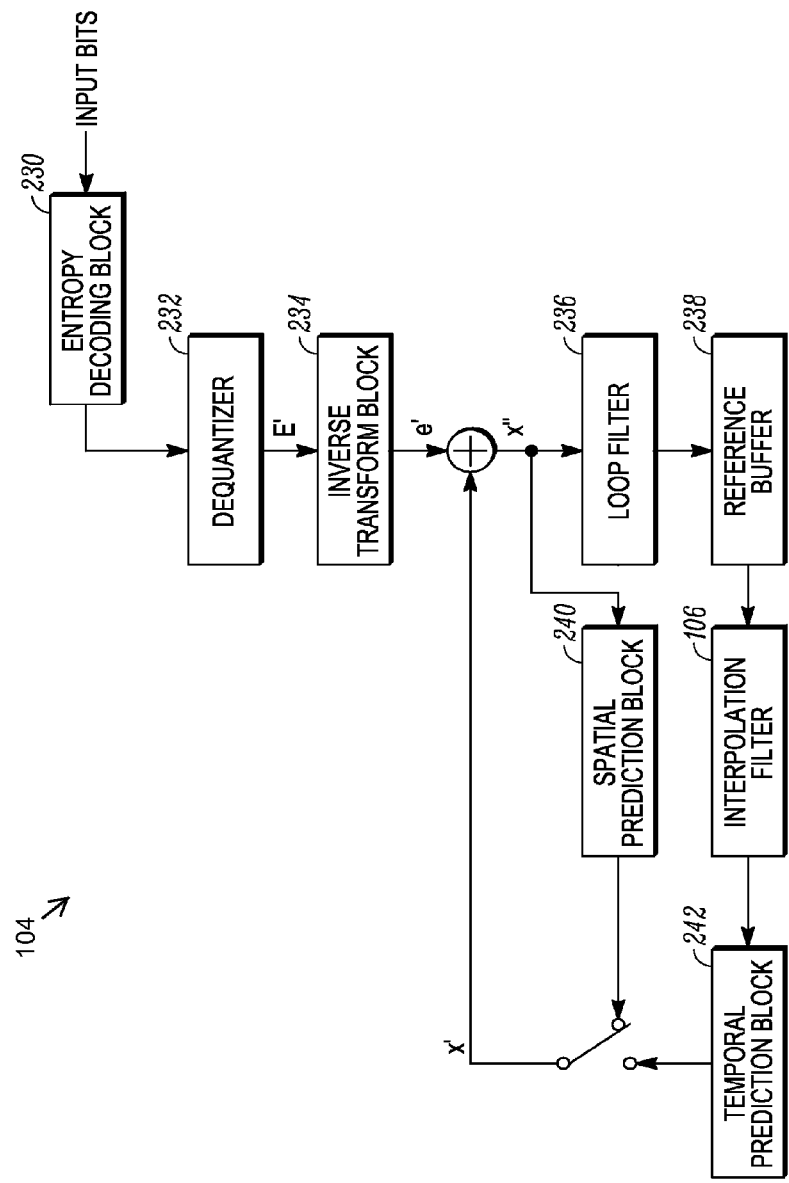
FIG. 2B depicts an example of a decoder according to one embodiment.

FIG. 2B depicts an example of decoder 104 according to one embodiment. A general operation of decoder 104 will now be described. It will be understood that variations on the decoding process described will be appreciated by a person skilled in the art based on the disclosure and teachings herein. Decoder 104 receives input bits from encoder 102 for compressed video content.

An entropy decoding block 230 performs entropy decoding on input bits corresponding to quantized transform coefficients of a residual PU. A de-quantizer 232 de-quantizes the quantized transform coefficients of the residual PU. De-quantizer 232 then outputs the de-quantized transform coefficients of the residual PU, E'. An inverse transform block 234 receives the de-quantized transform coefficients, which are then inverse transformed resulting in a reconstructed residual PU, e'.

The reconstructed PU, e', is then added to the corresponding prediction PU, x', either spatial or temporal, to form the new constructed PU, x". A loop filter 236 performs de-blocking on the reconstructed PU, x", to reduce blocking artifacts. Additionally, loop filter 236 may perform a sample adaptive offset process after the completion of the de-blocking filter process for the decoded picture, which compensates for a pixel value offset between reconstructed pixels and original pixels. Also, loop filter 236 may perform an adaptive loop filter over the reconstructed PU, which minimizes coding distortion between the input and output pictures. Additionally, if the reconstructed pictures are reference pictures, the reference pictures are stored in a reference buffer 238 for future temporal prediction.

The prediction PU, x', is obtained through either spatial prediction or temporal prediction. A spatial prediction block 240 may receive decoded spatial prediction directions per PU, such as horizontal, vertical, 45-degree diagonal, 135-degree diagonal, DC (flat averaging), and planar. The spatial prediction directions are used to determine the prediction PU, x'.

Interpolation filter 106 interpolates sub-pel pixel values for input into a temporal prediction block 242. Temporal prediction block 242 performs temporal prediction through a motion estimation and motion compensation operation. A decoded motion vector or a motion vector derived from other motion information is then used to determine the prediction PU, x'.

DCT-Based Fractional-Pel Interpolation Filter Design

DCT is one of the most popular transforms used in video signal processing applications. As DCT can reflect the characteristics of images, with a suitable modification of DCT multiplying coefficients, alias-free image zooming can be achieved.

In DCT, the (i,j)th coefficient of m×m DCT, $DCT_m(i,j)$, is $$DCT_m(i, j) = \begin{cases} \dfrac{1}{\sqrt{m}} & i = 0, 0 \le j \le m-1 \\ \dfrac{\cos\left(\dfrac{2i+1}{2m} j\pi\right)}{\sqrt{\dfrac{m}{2}}} & 1 \le i \le m-1, 0 \le j \le m-1 \end{cases}$$

The forward transform for an m×n image, $f_{m \times n}$, is $$F_{m \times n} = DCT_m \times f_{m \times n} \times DCT_n^T$$

where $F_{m \times n}$ stands for the transformed signal. In order to change image size from m×n to k×l, transformed signal, $F_{k \times l}$, should be obtained from $F_{m \times n}$.

1) Coefficient Discarding.

If k>m, then $$F'_{k \times l}(i, j) = \begin{cases} F_{m \times n}(i, j) & 0 \le j \le m-1, 0 \le i \le k-1 \\ 0 & \text{otherwise} \end{cases}$$

where zero padding is used in order not to introduce extra high frequency components.

2) Coefficient Scaling.

This step is needed for the sake of keeping the dynamic range for output image since the normalized m×m DCT matrix contains the factor of $$\frac{1}{\sqrt{m}}.$$

$$F_{k \times l}(i, j) = F'_{k \times l}(i, j) \times \frac{\sqrt{k \times l}}{\sqrt{m \times n}}$$

The final output image with the size of k×l is obtained by $$f_{k \times l} = DCT_k^T F_{k \times l} \times DCT_l$$

The above algorithm can achieve an accurate image zooming without aliasing or blocking. Even though the algorithm can be used for interpolation while overcoming the defect of aliasing, it is too complicated for practical implementation. This can be modified by using two 1-D DCTs and two 1-D IDCTs separately with less input pixels. However, DCT and IDCT operations still need considerable computational and memory resources. Moreover, the full-pel pixels are changed after interpolation, which results in inaccurate full-pel motion search. More important, most of the interpolated pixels do not make use of all the nearest integer pixels.

Interpolation using filters are more preferable for the consideration of complexity and performance. The DCT-based Fractional-pel Interpolation Filter design only considers the linear relation between the integer pixels and interpolated fractional pixels.

Figure 3:
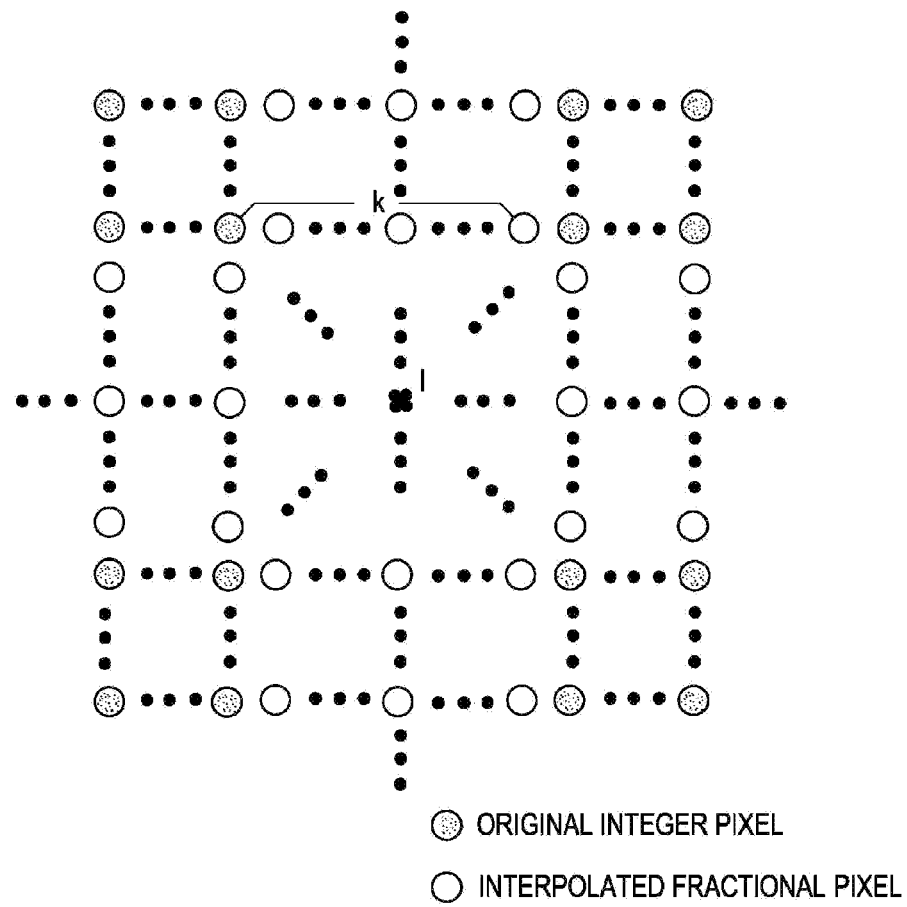
FIG. 3 depicts an example of 1/k-pel interpolation based on DCT according to one embodiment.

FIG. 3 shows 1/k-pel interpolation based on DCT. The original image is $f_{mk*n}$ and k−1 fractional pixels are interpolated between every two integer pixels. Therefore, the interpolated image contains (mk−k+1)*(nk−k+1) pixels, denoted as $f_{(mk-k+1) \times (nk-k+1)}$. The icon in the center of FIG. 3 is used for the interpolated fractional pixel I in the central area of the image. The DCT-based Fractional-pel Interpolation Filter design only considers the contribution of those integer pixels for I, thus deducing the taps of the interpolation filter.

Briefly, the general rule for The DCT-based Fractional-pel Interpolation Filter design is to transform the original image, $f_{m \times n}$, into transform domain by m×n DCT and obtain $F_{m \times n}$ first. Then the coefficients are padded and scaled to get $F_{(mk-k+1) \times (nk-k+1)}$. After that, inverse transform $F_{(mk-k+1) \times (nk-k+1)}$ into spatial domain by (mk−k+1)×(nk−k+1) IDCT. Finally, get the filter taps of those integer pixels to interpolate the specified fractional pixel.

Interpolation Filter Selection

Figure 4:
FIG. 4 depicts positions of half-pel and quarter-pel pixels between full-pel pixels along a pixel line within an image according to one embodiment.

To estimate a fractional pixel (sub-pel displacements), an image signal on each sub-pel position is generated by an interpolation process. FIG. 4 depicts positions of half-pel and quarter-pel pixels between full-pel pixels along a pixel line within an image according to one embodiment. For example, the pixel line may be along a row or column on an image. Multiple interpolation calculations may be made along different rows and columns of an image. Full-pel pixels are represented by integer pixels and are shown in FIG. 4 as pixels L5, L4, L3, L2, L1, L0, R0, R1, R2, R3, R4, and R5. H is a half-pel pixel between full-pel pixels L0 and R0. QL is a sub-pel pixel (quarter-pel pixel) between full-pel pixels L0 and H and QR is a sub-pel pixel between half-pel pixel H and full-pel pixel R0.

The quarter-pel and half-pel pixels may be interpolated using the values of spatial neighboring full-pel pixels. For example, the half-pel pixel H may be interpolated using the values of full-pel pixels L5, L4, L3, L2, L1, L0, R0, R1, R2, R3, R4, and R5. Different coefficients may also be used to weight the values of the neighboring pixels and provide different characteristics of filtering.

Figure 5:
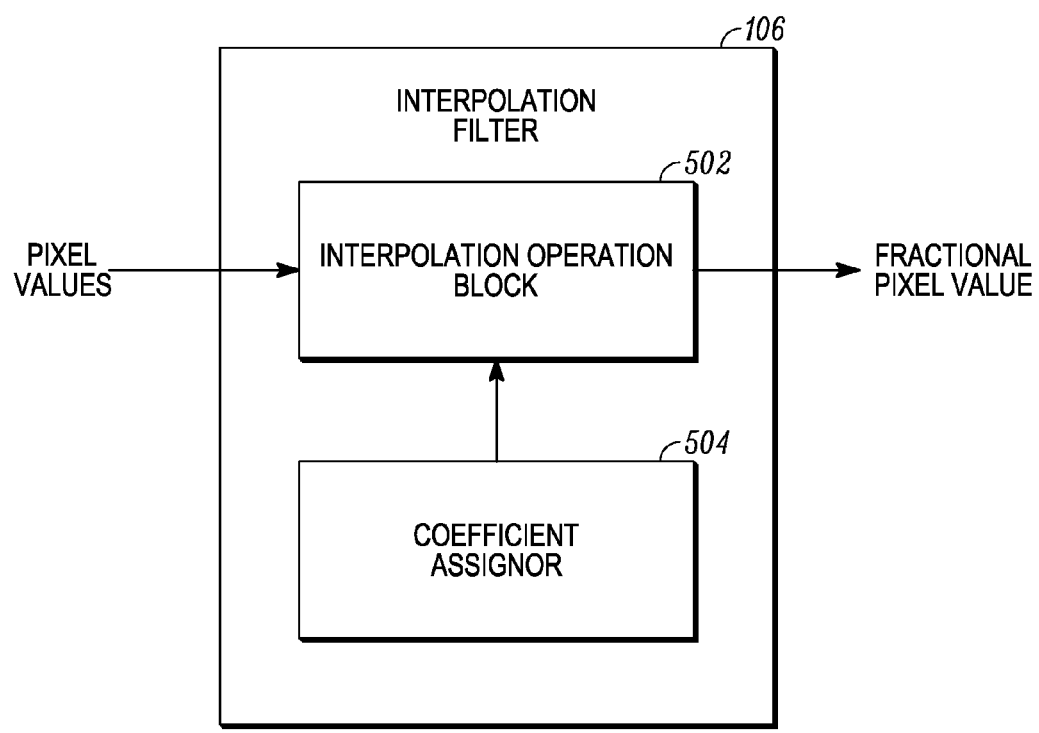
FIG. 5 shows an example of an interpolation filter according to one embodiment.

FIG. 5 shows an example of an interpolation filter 106 according to one embodiment. Interpolation filter 106 receives full-pel pixel values. For example, the values of full-pel pixels L5, L4, L3, L2, L1, L0, R0, R1, R2, R3, R4, and R5 are received. Coefficient assigner 504 assigns coefficients to weight the full-pel pixel values. In one embodiment, the coefficient values may be static. For example, for each interpolation for a sub-pel position, the same coefficient values are used. In other embodiments, the coefficient values are determined adaptively. Also, different coefficient values may be used to interpolate different sub-pel pixel positions. For example, interpolation of half-pel positions uses different coefficient values than interpolation of quarter-pel positions.

An interpolation operation block 502 performs an interpolation operation to determine a sub-pel pixel value. Different coefficients are used for different sub-pel positions. The same operation may be used to calculate the sub-pel pixel value; however, different operations may be used and contemplated.

One example of a calculation is:

$$H=(-7*L1+39*L0+39*R0-7*R1+32)>>6;$$

The half-pel position (H) is calculated by applying coefficient values to the full-pel pixel values (L1, L0, R0, and R1). For example, a full-pel pixel value is multiplied by a corresponding coefficient value. Then, the results of the multiplied values are added together. A value of "32" is added and the result is right shifted by "6". The adding of "32" and shifting to the right (6 bits) is equivalent to adding 32 and dividing by 64, which truncates the value. Other operations are also contemplated. For example, interpolation operation block 502 may apply the coefficients to different full-pel pixel values or a different truncating operation may be performed. Or different operations which are mathematically equivalent to the original interpolation operation could be applied to achieve the same results.

In some cases, the coefficient value used may be "0". In one embodiment, interpolation operation block 502 may not use that coefficient in the calculation. In other embodiments, the 0 value may be used in the calculation.

Figure 6:
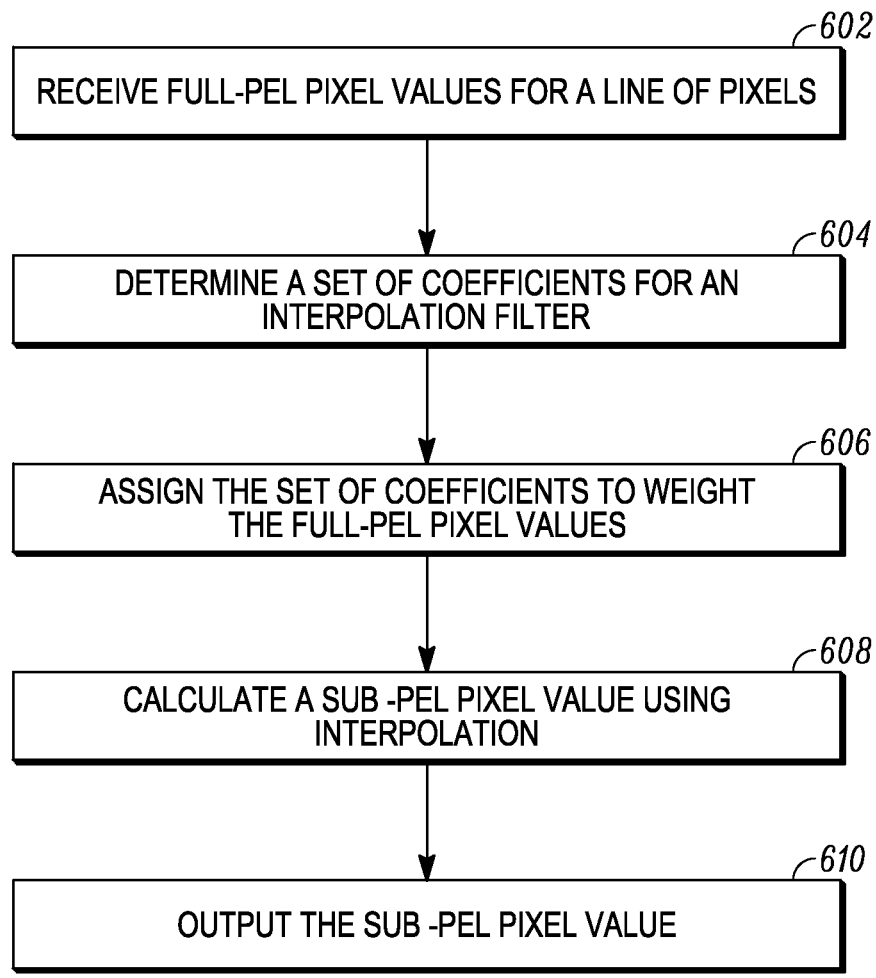
FIG. 6 depicts a simplified flowchart for a method interpolating sub-pel pixel values according to one embodiment.

FIG. 6 depicts a simplified flowchart 600 for a method interpolating sub-pel pixel values according to one embodiment. At 602, interpolation filter 106 receives full-pel pixel values for a line of pixels. For example, encoder 102 receives full-pel pixel values for encoding a PU or decoder 104 receives full-pel pixel values for decoding compressed bits.

At 604, coefficient assigner 504 determines a set of coefficients for an interpolation filter 106 to interpolate a sub-pel pixel value for a motion compensation operation. In one example, the coefficients for interpolation filter 106 are fixed and applicable to compression of all sequences for a sub-pel position.

At 606, coefficient assigner 504 assigns the set of coefficients to weight full-pel pixel values. For example, each coefficient is assigned to a full-pel pixel value. By determining coefficients with zero values, the complexity can be reduced. When zero coefficient values are not used in the operation, the full-pel pixel values that correspond to non-zero coefficient values need not be determined. This ensures that a full-pel pixel value that corresponds to the zero coefficient is not used in the interpolation calculation. Coefficient assigner 504 may signal which full-pel pixel value corresponds to a zero value.

At 608, interpolation operation block 502 calculates an interpolated sub-pel pixel value using the coefficient values and the full-pel pixel values. At 610, interpolation filter 106 outputs the interpolated sub-pel pixel value.

Two different sets of coefficient values will be described, but others may be used. For example, in Table 2 below the following coefficient values are used:

$$QL=(2*L2-8*L1+58*L0+16*R0-6*R1+2*R2+32)>>6;$$

$$H=(3*L2-11*L1+40*L0+40*R0-11*R1+3*R2+32)>>6;$$

$$QR=(2*L2-6*L1+16*L0+58*R0-8*R1+2*R2+32)>>6;$$ Example HQ. 4

$$QL=(-5*L1+59*L0+13*R0-3*R1+32)>>6;$$

$$H=(-7*L1+39*L0+39*R0-7*R1+32)>>6;$$

$$QR=(-3*L1+13*L0+59*R0-5*R1+32)>>6;$$ Example HQ. 5

These two examples require fewer taps to be used, which reduces complexity. Less data fetching and computation is needed because less full-pel values need to be fetched and used in the calculation. Also, resulting performance of interpolation filter 106 is improved using these coefficients.

The following describes different coefficient values that may be used. The different filters differ in their frequency responses and lengths, and so it is expected that compression performance and complexity will differ among the filters. It will be understood that scaling of the values for a given filter may be used. For example, the values may be doubled, the operations performed, and the result scaled down by half. A person of skill in the art will appreciate equivalents in scaling of the values.

High Efficiency Interpolation Filters

Combination of Half Pixel and Quarter Pixel Interpolation Filters (HQ)

In one embodiment, the sub pixels QL and QR are interpolated using the values of spatial neighboring full-pel pixels, L5, L4, L3, L2, L1, L0, R0, R1, R2, R3, R4 and R5, as follows:

$$QL=(-2*L5+6*L4-12*L3+21*L2-42*L1+234*L0+70*R0-29*R1+17*R2-10*R3+5*R4-2*R5+128)>>8;$$

$$H=(-3*L5+9*L4-16*L3+28*L2-52*L1+162*L0+162*R0-52*R1+28*R2-16*R3+9*R4-3*R5+128)>>8;$$

$$QR=(-2*L5+5*L4-10*L3+17*L2-29*L1+70*L0+234*R0-42*R1+21*R2-12*R3+6*R4-2*R5+128)>>8;$$ Example HQ. 1

$$QL=(3*L4-9*L3+19*L2-40*L1+234*L0+68*R0-28*R1+15*R2-8*R3+2*R4+128)>>8;$$

$$H=(4*L4-13*L3+25*L2-50*L1+162*L0+162*R0-50*R1+25*R2-13*R3+4*R4+128)>>8;$$

$$QR=(2*L4-8*L3+15*L2-28*L1+68*L0+234*R0-40*R1+19*R2-9*R3+3*R4+128)>>8;$$ Example HQ. 2

$$QL=(-5*L3+16*L2-38*L1+235*L0+65*R0-25*R1+12*R2-4*R3+128)>>8;$$

$H=(-6*L3+21*L2-48*L1+161*L0+161*R0-48*R1+21*R2-6*R3+128)>>8;$ $QR=(-4*L3+12*L2-25*L1+65*L0+235*R0-38*R1+16*R2-5*R3+128)>>8;$ Example HQ. 3

$QL=(8*L2-33*L1+235*L0+61*R0-21*R1+6*R2+128)>>8;$ $H=(12*L2-43*L1+159*L0+159*R0-43*R1+12*R2+128)>>8;$ $QR=(6*L2-21*L1+61*L0+235*R0-33*R1+8*R2+128)>>8;$ Example HQ. 4

$QL=(-19*L1+236*L0+50*R0-11*R1+128)>>8;$ $H=(-27*L1+155*L0+155*R0-27*R1+128)>>8;$ $QR=(-11*L1+50*L0+236*R0-19*R1+128)>>8;$ Example HQ. 5

Table 1 summarizes the filter coefficients.

TABLE 1

High complexity DCT-based interpolation filter coefficients

| Number of Filter Taps | Position | Coefficients |
|---|---|---|
| 4 | ¼ | {−19, 236, 50, −11,} |
|  | ½ | {−27, 155, 155, −27,} |
|  | ¾ | {−11, 50, 236, −19,} |
| 6 | ¼ | {8, −33, 235, 61, −21, 6,} |
|  | ½ | {12, −43, 159, 159, −43, 12,} |
|  | ¾ | {6, −21, 61, 235, −33, 8,} |
| 8 | ¼ | {−5, 16, −38, 235, 65, −25, 12, −4,} |
|  | ½ | {−6, 21, −48, 161, 161, −48, 21, −6,} |
|  | ¾ | {−4, 12, −25, 65, 235, −38, 16, −5,} |
| 10 | ¼ | {3, −9, 19, −40, 234, 68, −28, 15, −8, 2,} |
|  | ½ | {4, −13, 25, −50, 162, 162, −50, 25, −13, 4,} |
|  | ¾ | {2, −8, 15, −28, 68, 234, −40, 19, −9, 3,} |
| 12 | ¼ | {−2, 6, −12, 21, −42, 234, 70, −29, 17, −10, 5, −2,} |
|  | ½ | {−3, 9, −16, 28, −52, 162, 162, −52, 28, −16, 9, −3,} |
|  | ¾ | {−2, 5, −10, 17, −29, 70, 234, −42, 21, −12, 6, −2,} |

High Efficiency Low Complexity Interpolation Filters Combination of Half Pixel and quarter Pixel Interpolation Filters (HQ)

In one embodiment, the sub pixels QL and QR are interpolated using the values of spatial neighboring full-pel pixels, L5, L4, L3, L2, L1, L0, R0, R1, R2, R3, R4 and R5, as follows:

$QL=(0*L5+2*L4-3*L3+5*L2-11*L1+58*L0+18*R0-7*R1+4*R2-3*R3+1*R4-0*R5+32)>>6;$ $H=(-1*L5+2*L4-4*L3+7*L2-13*L1+41*L0+41*R0-13*R1+7*R2-4*R3+2*R4-1*R5+32)>>6;$ $QR=(0*L5+1*L4-3*L3+4*L2-7*L1+18*L0+58*R0-11*R1+5*R2-3*R3+2*R4-0*R5+32)>>6;$ Example HQ. 1

$QL=(1*L4-2*L3+5*L2-10*L1+58*L0+17*R0-7*R1+4*R2-2*R3+0*R4+32)>>6;$ $H=(1*L4-3*L3+6*L2-12*L1+40*L0+40*R0-12*R1+6*R2-3*R3+1*R4+32)>>6;$ $QR=(0*L4-2*L3+4*L2-7*L1+17*L0+58*R0-10*R1+5*R2-2*R3+1*R4+32)>>6;$ Example HQ. 2

$QL=(-1*L3+4*L2-10*L1+58*L0+17*R0-6*R1+3*R2-1*R3+32)>>6;$ $H=(-1*L3+5*L2-12*L1+40*L0+40*R0-12*R1+5*R2-1*R3+32)>>6;$ $QR=(-1*L3+3*L2-6*L1+17*L0+58*R0-10*R1+4*R2-1*R3+32)>>6;$ Example HQ. 3

$QL=(2*L2-8*L1+58*L0+16*R0-6*R1+2*R2+32)>>6;$ $H=(3*L2-11*L1+40*L0+40*R0-11*R1+3*R2+32)>>6;$ $QR=(2*L2-6*L1+16*L0+58*R0-8*R1+2*R2+32)>>6;$ Example HQ. 4

$QL=(-5*L1+59*L0+13*R0-3*R1+32)>>6;$ $H=(-7*L1+39*L0+39*R0-7*R1+32)>>6;$ $QR=(-3*L1+13*L0+59*R0-5*R1+32)>>6;$ Example HQ. 5

Table 2 summarizes the filter coefficients.

TABLE 2

Low complexity DCT-based interpolation filter coefficients

| Number of Filter Taps | Position | Coefficients |
|---|---|---|
| 4 | ¼ | {−5, 59, 13, −3,} |
|  | ½ | {−7, 39, 39, −7,} |
|  | ¾ | {−3, 13, 59, −5,} |
| 6 | ¼ | {2, −8, 58, 16, −6, 2,} |
|  | ½ | {3, −11, 40, 40, −11, 3,} |
|  | ¾ | {2, −6, 16, 58, −8, 2,} |
| 8 | ¼ | {−1, 4, −10, 58, 17, −6, 3, −1,} |
|  | ½ | {−1, 5, −12, 40, 40, −12, 5, −1,} |
|  | ¾ | {−1, 3, −6, 17, 58, −10, 4, −1,} |
| 10 | ¼ | {1, −2, 5, −10, 58, 17, −7, 4, −2, 0,} |
|  | ½ | {1, −3, 6, −12, 40, 40, −12, 6, −3, 1,} |
|  | ¾ | {0, −2, 4, −7, 17, 58, −10, 5, −2, 1,} |
| 12 | ¼ | {0, 2, −3, 5, −11, 58, 18, −7, 4, −3, 1, 0,} |
|  | ½ | {−1, 2, −4, 7, −13, 41, 41, −13, 7, −4, 2, −1,} |
|  | ¾ | {0, 1, −3, 4, −7, 18, 58, −11, 5, −3, 2, 0,} |

Further, testing shows that the proposed 10-tap interpolation filter can achieve the same Rate-Distortion performance while saving 4%-5% of the decoding time.

Particular embodiments may be implemented in a non-transitory computer-readable storage medium for use by or in connection with the instruction execution system, apparatus, system, or machine. The computer-readable storage medium contains instructions for controlling a computer system to perform a method described by particular embodiments. The instructions, when executed by one or more computer processors, may be operable to perform that which is described in particular embodiments.

As used in the description herein and throughout the claims that follow, "a", "an", and "the" includes plural references unless the context clearly dictates otherwise. Also, as used in the description herein and throughout the claims that follow, the meaning of "in" includes "in" and "on" unless the context clearly dictates otherwise.

The above description illustrates various embodiments of the present invention along with examples of how aspects of the present invention may be implemented. The above examples and embodiments should not be deemed to be the only embodiments, and are presented to illustrate the flexibility and advantages of the present invention as defined by the following claims. Based on the above disclosure and the following claims, other arrangements, embodiments, implementations and equivalents may be employed without departing from the scope of the invention as defined by the claims.

What is claimed is:

1. A method for encoding video content, the method comprising:
receiving a plurality of full-pel pixel values corresponding to each line of a plurality of lines of full-pel pixels;
for each line of the plurality of lines, determining an interpolated sub-pel pixel value for each of three sub-pel pixels between two adjacent full-pel pixels, the three sub-pel pixels being a half-pel pixel, a first quarter-pel pixel and a second quarter-pel pixel between the two adjacent full-pel pixels, by:
determining a set of coefficients for an interpolation filter;
assigning a first coefficient to weight a first full full-pel pixel value in the plurality of full-pel pixel values to a first operation in the interpolation filter;
assigning a second coefficient to weight a second full-pel pixel value in the plurality of full-pel pixel values in a second operation in the interpolation filter;
assigning a third coefficient to weight a third full-pel value in the plurality of full-pel pixel values in a third operation in the interpolation filter;
assigning a fourth coefficient to weight a fourth full-pel pixel value in the plurality of full-pel pixel values in a fourth operation in the interpolation filter; and
determining the interpolated sub-pel pixel value from the first operation, the second operation, the third operation, and the fourth operation, by:
adding a first integer to a sum of outputs of the first operation, the second operation, the third operation and the fourth operation to obtain a first value; and
right-shifting the first value by a second integer to obtain the interpolated sub-pixel value; and
outputting each interpolated sub-pel pixel value for use in a motion compensation operation, wherein the set of coefficients used to determine an interpolated sub-pel pixel value for the half-pel pixel is different from the set of coefficients used to determine an interpolated sub-pel pixel value for the first quarter-pel pixel and from the set of coefficients used to determine an interpolated sub-pel pixel value for the second quarter-pel pixel.

2. The method of claim 1 wherein the set of coefficients used to determine an interpolated sub-pel pixel value for the first quarter-pel pixel is different from the set of coefficients used to determine an interpolated sub-pel pixel value for the second quarter-pel pixel.

3. The method of claim 1 wherein the set of coefficients used to determine an interpolated sub-pixel value for the half-pel pixel comprises the first coefficient having a value of −7, the second coefficient having a value of 39, the third coefficient having a value of 39, and the fourth coefficient having a value of −7.

4. The method of claim 3 wherein the set of coefficients used to determine an interpolated sub-pixel value for the first quarter-pel pixel comprises the first coefficient having a value of −5, the second coefficient having a value of 59, the third coefficient having a value of 13, and the fourth coefficient having a value of −3; and wherein the set of coefficients used to determine an interpolated sub-pixel value for the second quarter-pel pixel comprises the first coefficient having a value of −3, the second coefficient having a value of 13, the third coefficient having a value of 59, and the fourth coefficient having a value of −5.

5. The method of claim 1 wherein the first integer is 32 and the second integer is 6.

6. The method of claim 1 wherein the first integer is 128 and the second integer is 8.

7. The method of claim 1 wherein each set of coefficients for the interpolation filter comprises at least ten coefficients, a coefficient of the set of coefficients used to determine an interpolated sub-pel pixel value for the first quarter-pel pixel is equal to zero, and a coefficient of the set of coefficients used to determine an interpolated sub-pel pixel value for the second quarter-pel pixel is equal to zero.

8. A method for decoding video content, the method comprising:
receiving a plurality of full-pel pixel values corresponding to a line of a plurality of lines of full-pel pixels;
determining a first set of coefficients for an interpolation filter to interpolate a sub-pel pixel value corresponding to a half-pel position between two adjacent full-pel pixels in the line;
assigning each coefficient of the first set of coefficients to weight a respective full-pel pixel value in the plurality of full-pel pixel values in a first operation in the interpolation filter to generate an interpolated sub-pel pixel value corresponding to the half-pel position;
determining a second set of coefficients for the interpolation filter to interpolate a sub-pel pixel value corresponding to a first quarter-pel position between the two adjacent full-pel pixels in the line;
assigning each coefficient of the second set of coefficients to weight a respective full-pel pixel value in the plurality of full-pel pixel values in a second operation in the interpolation filter to generate an interpolated sub-pel pixel value corresponding to the first quarter-pel position;
determining a third set of coefficients for the interpolation filter to interpolate a sub-pel pixel value corresponding to a second quarter-pel position between the two adjacent full-pel pixels in the line;
assigning each coefficient of the third set of coefficients to weight a respective full-pel pixel value in the plurality of full-pel pixel values in a third operation in the interpolation filter to generate an interpolated sub-pel pixel value corresponding to the second quarter-pel position;
determining the interpolated sub-pel pixel value from the first operation, the second operation, the third operation, and the fourth operation, by:
adding a first integer to a sum of outputs of the first operation, the second operation, the third operation and the fourth operation to obtain a first value; and
right-shifting the first value by a second integer to obtain the interpolated sub-pixel value; and
outputting the interpolated sub-pel pixel values corresponding to the half-pel position, the first quarter-pel position and the second quarter-pel position for use in a motion compensation operation.

9. An apparatus for decoding video content, the apparatus comprising:
one or more computer processors; and
a computer-readable storage medium comprising instructions for controlling the one or more computer processors to:
receive a plurality of full-pel pixel values corresponding to a plurality of full-pel pixels of a line of in an image;
determine an interpolated sub-pel pixel value for each sub-pel pixel of at least three sub-pel pixels between two adjacent full-pel pixels by:

determining a set of coefficients for an interpolation;
assigning a first coefficient to weight a first full-pel pixel value in the plurality of full-pel pixel values in a first operation in the interpolation filter;
assigning a second coefficient to weight a second full-pel pixel value in the plurality of full-pel pixel values in a second operation in the interpolation filter;
assigning a third coefficient to weight a third full-pel pixel value in the plurality of full-pel pixel values in a third operation in the interpolation filter;
assigning a fourth coefficient to weight a fourth full-pel pixel value in the plurality of full-pel pixel values in a fourth operation in the interpolation filter; and
determining the interpolated sub-pel pixel value from the first operation, the second operation, the third operation, and the fourth operation, by:
adding a first integer to a sum of outputs of the first operation, the second operation, the third operation and the fourth operation to obtain a first value; and
right-shifting the first value by a second integer to obtain the interpolated sub-pixel value; and
output each interpolated sub-pel pixel value for use in a motion compensation operation.

10. The apparatus of claim 9 wherein the at least three sub-pel pixels comprises a quarter-pel pixel, a half-pel pixel and a three quarter-pel pixel, the set of coefficients used to determine an interpolated sub-pel pixel value for the half-pel pixel is different from the set of coefficients used to determine an interpolated sub-pel pixel value for the quarter-pel pixel and from the set of coefficients used to determine an interpolated sub-pel pixel value for the three quarter-pel pixel, and the set of coefficients used to determine the interpolated sub-pel pixel value for the quarter-pel pixel is different from the set of coefficients used to determine the interpolated sub-pel pixel value for the three quarter-pel pixel.

* * * * *